United States Patent
Barry

[19]

[11] Patent Number: 6,024,318
[45] Date of Patent: Feb. 15, 2000

[54] ICE FISHING APPARATUS

[76] Inventor: Bruce Barry, 1239 Foothill Ct., Fergus Falls, Minn. 56537

[21] Appl. No.: 09/084,575

[22] Filed: May 25, 1998

[51] Int. Cl.$^7$ .................................................. B65H 75/38
[52] U.S. Cl. ........................ 242/406; 242/401; 242/396.9; 43/17
[58] Field of Search ............................ 743/17; 242/406, 242/401, 396.9, 398; 248/166, 167

[56] References Cited

U.S. PATENT DOCUMENTS

| | | | |
|---|---|---|---|
| 75,075 | 3/1868 | Talbot | 43/17 |
| 518,013 | 4/1894 | Thayer . | |
| 608,651 | 8/1898 | Cliff | 242/406 |
| 685,185 | 10/1901 | Smith | 242/406 |
| 857,326 | 6/1907 | Buckwalter | 242/396.9 |
| 1,230,467 | 6/1917 | Ehrler . | |
| 1,264,000 | 4/1918 | Bernhardt . | |
| 1,807,549 | 5/1931 | Reber | 242/406 |
| 1,854,103 | 4/1932 | Buhrie | 242/406 |
| 3,060,616 | 10/1962 | Woodley . | |
| 3,423,867 | 1/1969 | Bartletti . | |
| 3,745,689 | 7/1973 | Williams | 43/17 |
| 4,540,136 | 9/1985 | Rauch | 242/396.9 |
| 4,571,876 | 2/1986 | LeClair | 43/17 |
| 4,616,437 | 10/1986 | Harvey . | |
| 4,718,190 | 1/1988 | Ward et al. . | |
| 4,845,878 | 7/1989 | Hackel | 43/17 |
| 4,949,497 | 8/1990 | Lindell | 43/17 |
| 4,953,317 | 9/1990 | Ruchel | 43/17 |
| 5,297,357 | 3/1994 | Bigelow et al. | 43/17 |

FOREIGN PATENT DOCUMENTS

| | | | |
|---|---|---|---|
| 984147 | 2/1976 | Canada | 43/17 |
| 1731132 | 5/1992 | U.S.S.R. | 43/17 |

*Primary Examiner*—Michael J. Carone
*Assistant Examiner*—Fredrick T. French, III

[57] ABSTRACT

A ice fishing apparatus which is foldable into a compact storage position. The inventive device includes a U-shaped member, a pair of side legs pivotally attached to opposite sides of the U-shaped member, a rear leg pivotally attached to the rear portion of the U-shaped member, a reel rotatably attached within the U-shaped member by a shaft, and a winged nut threadably attached to the end of the shaft for allowing adjustment of the resistance placed upon the reel. The user positions the invention about the ice hole to insure proper gripping of the ice surface around the ice hole. When finished utilizing the invention, the user simply folds the legs toward one another to create a narrow structure for storage within a vehicle or other structure.

7 Claims, 3 Drawing Sheets

ICE FISHING APPARATUS

BACKGROUND OF THE INVENTION

1. Field of the Invention

The present invention relates generally to ice fishing devices and more specifically it relates to an ice fishing apparatus which is foldable into a compact storage position.

Ice fishing devices are commonly utilized among fishermen. Most ice fishing devices are bulky and awkward to handle. Additionally, few ice fishing devices allow folding of them into a compact storage position. Most of the ice fishing devices require removal of the bobber before reeling in the fishing line for storage. Therefore, the user loses the exact depth that may have taken hours to locate where the best fishing occurs. Hence, it is an object of the present invention to provide a compact and foldable ice fishing apparatus. Additionally, it is another object of the present invention to provide an ice fishing apparatus which allows the user to retain the position of the bobber upon the fishing line to receive the desired fishing depth.

2. Description of the Prior Art

There are numerous ice fishing devices. For example, U.S. Pat. No. 518,013 to Thayer; U.S. Pat. No. 1,230,467 to Ehrler; U.S. Pat. No. 1,264,000 to Bernhardt; U.S. Pat. No. 3,060,616 to Woodley; U.S. Pat. No. 3,423,867 to Bartletti; U.S. Pat. No. 4,616,437 to Harvey; U.S. Pat. No. 4,718,190 to Ward et al all are illustrative of such prior art.

Thayer (U.S. Pat. No. 518,013) discloses a fishing apparatus comprising three legs attached to a base which rotatably supports a reel. A flag is attached to the base which springably notifies the user when a fish has been caught.

Ehrler (U.S. Pat. No. 1,230,467) discloses a fishing device for ice fishing which folds into a swaged structure. Ehrler teaches a pair of legs forming a U-shape pivotally attached to an opposing leg which supports a rotatably mounted reel. A locking strap is removably attached to the reel and the legs which prevents rotation of the reel during fishing.

Bernhardt (U.S. Pat. No. 1,264,000) discloses a signal device for fishing lines. Bernhardt teaches a three legged structure wherein the three legs are pivotally attached to a base member. The reel is rotatably attached between a pair of front legs.

While these devices may be suitable for the particular purpose to which they address, they are not as suitable for providing an ice fishing device which is foldable into a compact storage position. None of the prior disclose an ice fishing apparatus which is both foldable and stable when utilized for fishing. Further, none of the prior art devices disclose an ice fishing apparatus which is capable of receiving a larger bobber attached to the fishing line when reeled in for storage.

In these respects, the ice fishing apparatus according to the present invention substantially departs from the conventional concepts and designs of the prior art, and in so doing provides an apparatus primarily developed for the purpose of which is foldable into a compact storage position.

SUMMARY OF THE INVENTION

A primary object of the present invention is to provide an ice fishing apparatus that will overcome the shortcomings of the prior art devices.

Another object is to provide an ice fishing apparatus that is capable of folding into a compact storage position.

An additional object is to provide an ice fishing apparatus that is both foldable and stable when utilized for fishing upon an ice surface.

A further object is to provide an ice fishing apparatus that is capable of receiving a larger bobber when rotating the reel without the bobber engaging the invention.

Another object is to provide an ice fishing apparatus that allows the user to selectively prevent or reduce the amount of rotation of the reel.

An additional object is to provide an ice fishing apparatus that is adjustable to surround all sizes of ice holes.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
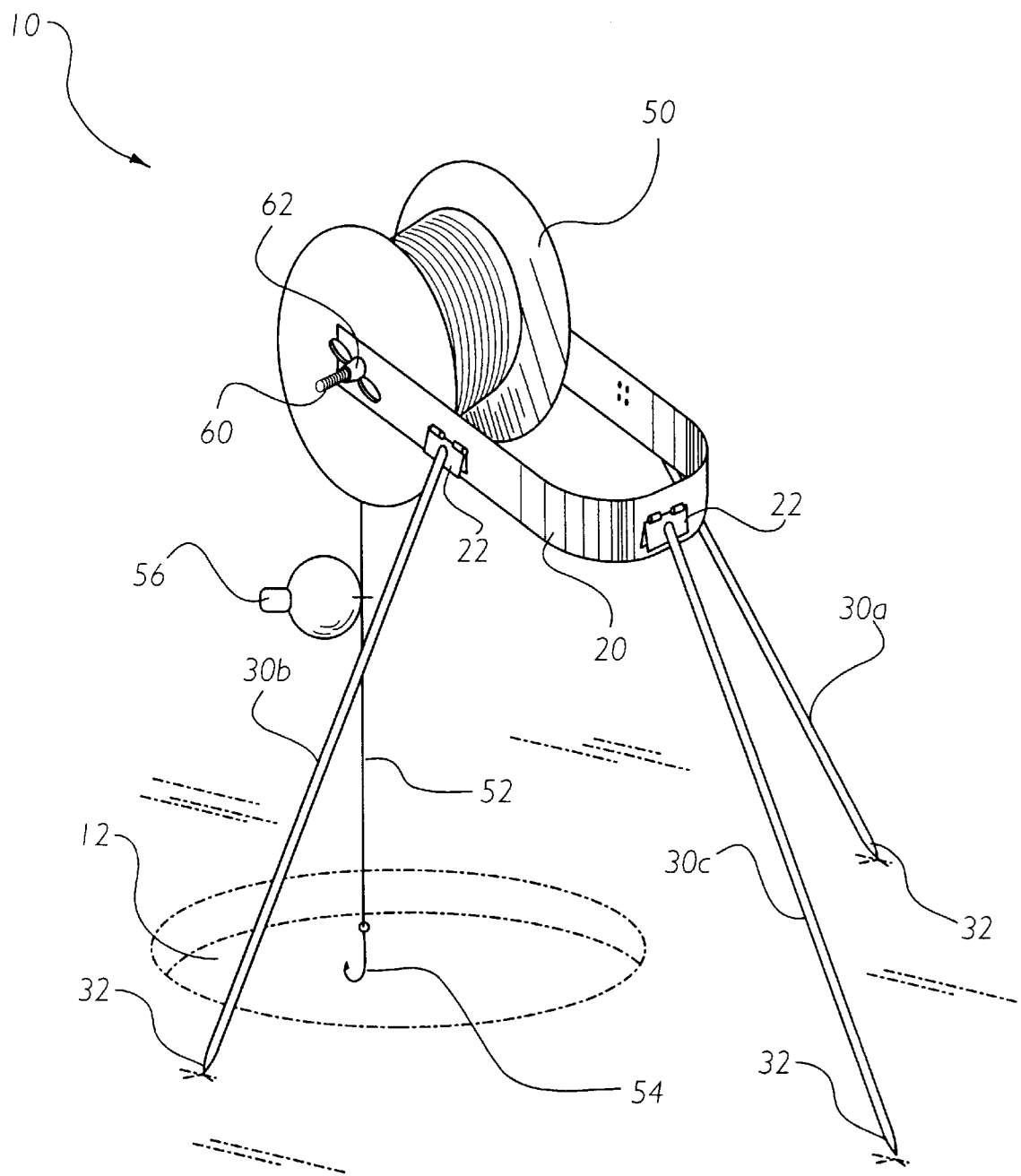
FIG. 1 is an upper perspective view of the present invention directly above a fish hole in the ice.

Turning now descriptively to the drawings, in which similar reference characters denote similar elements throughout the several view, FIGS. 1 through 4 illustrate an ice fishing apparatus 10, which comprises a U-shaped member 20, a pair of side legs 30a–b pivotally attached to opposite sides of the U-shaped member 20, a rear leg 30c pivotally attached to an unnumbered rear portion of the U-shaped member 20, a reel 50 rotatably attached within the U-shaped member 20 by a shaft 60, and a winged nut 62 threadably attached to the end of the shaft 60 for allowing adjustment of the resistance placed upon the reel 50. The user positions the invention about the ice hole 12 to insure proper gripping of the ice surface around the ice hole 12. When finished utilizing the invention, the user simply folds the legs 30a –c toward one another to create a narrow structure for storage within a vehicle or other structure. The reel 50 is preferably creates a sound when it rotates commonly called a rattler reel. The reel 50 has a plurality of tiny balls or similar objects contained within an enclosed cavity of the reel 50 which engage the side walls of the enclosed cavity when the reel 50 is rotated.

Figure 2:
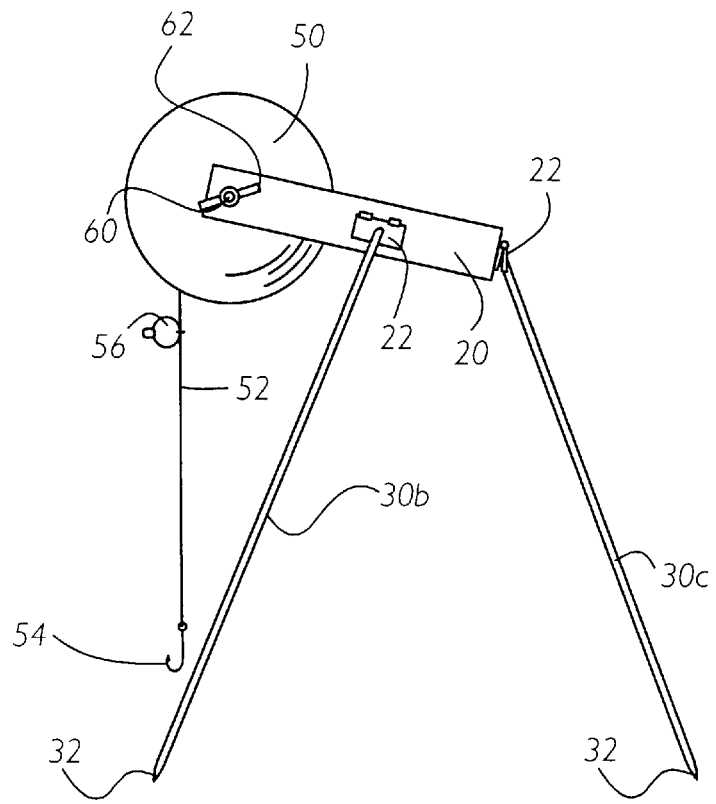
FIG. 2 is a side view of the present invention.
Figure 3:
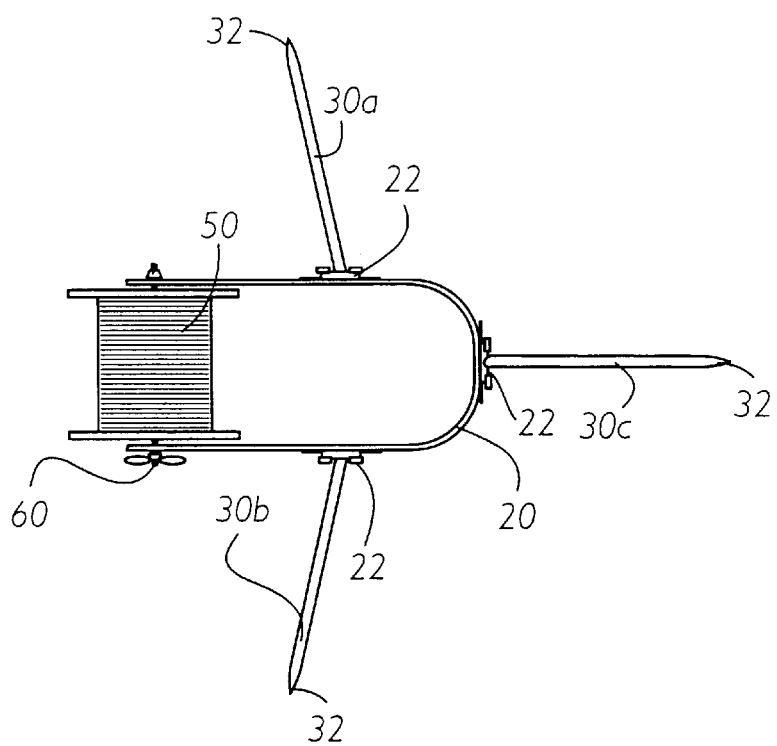
FIG. 3 is a top view of the present invention.
Figure 4:
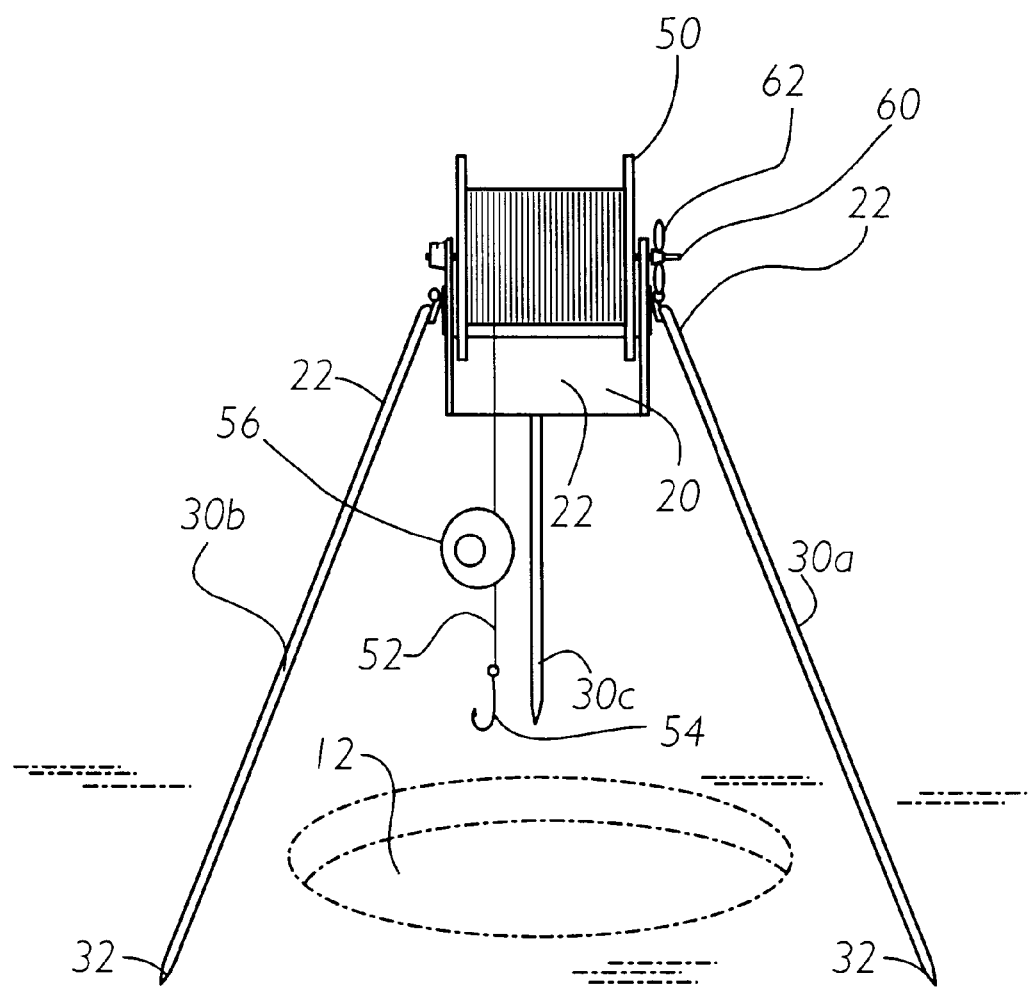
FIG. 4 is a front view of the present invention directly above a fishing hole.

As best shown in FIG. 3 of the drawings, the U-shaped member 20 has an unnumbered pair of opposing sides and a rear portion. As best shown in FIG. 4 of the drawings, the pair of side legs 30a–b are pivotally attached to the unnumbered opposing sides of the U-shaped member 20. As best shown in FIGS. 1 through 3 of the drawings, the rear leg 30c is pivotally attached to the unnumbered rear portion of the U-shaped member 20. Both the pair of side legs 30a–b and the rear leg 30c are preferably pivotally attached to U-shaped member 20 by hinges 22. The side legs 30a–b and the rear leg 30c are preferably constructed from an elongated metal shaft, however, various other materials may be utilized to construct them.

As best shown in FIG. 2 of the drawings, the distal ends of the side legs 30a–b and the rear leg 30c preferably have a spiked end 32. The spiked end 32 penetrates and grips the icy surface surrounding the ice hole 12 for preventing the collapsing of the present invention. Because the hinges 22 allow almost unlimited positioning of the side legs 30a–b and the rear leg 30c, all sizes of ice holes 12 may be accommodated for. The side legs 30a–b and the rear leg 30c may be folded toward one another to provide a compact storage position, either downwardly or upwardly with respect to the U-shaped member 20.

As best shown in FIG. 3 of the drawings, the reel 50 is rotatably mounted upon a shaft 60 adjacent the open end of the U-shaped member 20. The shaft 60 projects through the unnumbered opposing sides of the U-shaped member 20 adjacent the opening. A winged nut 62 is threadably attached to an unnumbered threaded end of the shaft 60 to allow the user to manually increase the resistance placed upon the reel 50 by the unnumbered opposing sides of the U-shaped member 20. This allows the user to select from an unlimited range of resistance to allow setting of the hook 54 within the mouth of the fish.

As best shown in FIG. 3 of the drawings, the reel 50 is a finite distance away from the unnumbered rear portion of the U-shaped member 20. The finite distance allows the bobber 56 attached to the fishing line 52 to freely rotate along with the reel 50 without engaging the unnumbered rear portion of the U-shaped member 20. This allows the user to rotate the reel 50 when finished fishing without having to disengage the bobber 56 from a desirable position on the fishing line 52. The hook 54 is also free to rotate along with the reel 50 when positioning the invention in the storage position.

In use, the user positions the side legs 30a–b and the rear leg 30c around the ice hole 12. The user applies downward pressure upon the U-shaped member 20 to force the spiked end 32 of the side legs 30a–b and the rear leg 30c to penetrate the surface of the ice. Thereafter, the user releases a desirable length of fishing line 52 depending upon the depth of the water and the weather conditions. The user then repositions the bobber 56, if necessary, upon the fishing line 52 to insure that the hook 54 is at the desired depth. The user then manipulates the winged nut 62 to receive the desired resistance upon the reel 50 depending upon the type of fish likely to engage. For example, if the type of fish attempted to be caught tends to play with the hook 54, allowing the fishing line 52 to be drawn out is desirable. After the user is finished utilizing the present invention, the user loosens the winged nut 62 to allow free rotation of the reel 50. The user then rotates the reel 50 to receive the fishing line 52 with the bobber 56 attached. Because the reel 50 is a finite distance away from the unnumbered rear portion of the U-shaped member 20 the bobber 56 may remain attached to the fishing line 52. Once the entire fishing line 52 is wound about the reel 50 the user tightens the winged nut 62 to prevent rotation of the reel 50. The user then folds the side legs 30a–b and the rear leg 30c toward one another. The legs 30a–b, 40 may be retained in the storage position by any conventional means such as wire or hooks. The user then may position the present invention in any convenient place for storage until needed later. When the user requires the use of the present invention, the above process is simply reversed thereby retaining the position of the bobber 56 on the fishing line 52.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ice fishing apparatus comprising:
    a base member;
    a reel rotatably mounted within said base member, wherein said reel receives a length of fishing line; and
    a plurality of legs pivotally attached to said base member for supporting said base member and said reel above an ice hole, wherein said plurality of legs are pivotable so that they may form an elongated structure either below or above said base member thereby allowing an individual to grasp said elongated structure;
    wherein said base member comprises a U-shaped member having a pair of opposing sides having legs, a rear portion having at least one leg and a front opening.

2. The ice fishing apparatus of claim 1, wherein said reel is rotatably mounted between said pair of opposing sides of said U-shaped member adjacent said front opening for allowing a bobber attached to said fishing line to freely rotate between said pair of opposing sides without engaging said rear portion.

3. The ice fishing apparatus of claim 2, including a shaft projects through said pair of opposing sides and said reel, wherein said reel freely rotates about said shaft.

4. The ice fishing apparatus of claim 3, including a winged nut threadably attached to a threaded end of said shaft for allowing a user to manually adjust a resistance applied to said reel by said pair of opposing sides.

5. The ice fishing apparatus of claim 4, wherein said plurality of legs comprises:
    a pair of side legs pivotally attached to said opposing sides of said U-shaped member; and
    a rear leg pivotally attached to said rear portion of said U-shaped member.

6. The ice fishing apparatus of claim 5, wherein said pair of side legs and said rear leg include a spiked distal end for penetrating an ice surface surrounding said ice hole.

7. The ice fishing apparatus of claim 6, wherein said reel make an audible sound when rotated for notifying the user when a fish has engaged said fishing line.

* * * * *